United States Patent

Lorenz et al.

[11] Patent Number: 6,002,469
[45] Date of Patent: Dec. 14, 1999

[54] APPARATUS FOR TENSIONING COPY MASTERS

[75] Inventors: Bernhard Lorenz, Marzling; Georg Kurzmaier, Greifenberg, both of Germany

[73] Assignee: Agfa-Gevaert AG, Leverkusen, Germany

[21] Appl. No.: 09/163,241

[22] Filed: Sep. 30, 1998

[30] Foreign Application Priority Data

Oct. 4, 1997 [DE] Germany ............................ 197 43 948

[51] Int. Cl.$^6$ .............................. G03B 27/62; G03B 27/52
[52] U.S. Cl. ................................. 355/75; 355/41
[58] Field of Search .................... 355/75, 76, 41; 352/223, 224, 227

[56] References Cited

U.S. PATENT DOCUMENTS 2,959,096  11/1960  Bobeck et al. ........................... 355/75
4,175,858  11/1979  Meadows .................................. 355/75
5,028,956   7/1991  VanScooter .............................. 355/72

*Primary Examiner*—Safet Metjahic
*Assistant Examiner*—Hung Henry Nguyen
*Attorney, Agent, or Firm*—Darby & Darby

[57] ABSTRACT

An apparatus for tensioning copy masters is described which has a guide for guiding the copy masters in a film transport direction (E). To place the copy masters under tension in a transverse direction (D) perpendicular to the film transport direction (E), the apparatus of the invention has a transverse tensioning device which includes clamping arrangement for clamping the copy masters. This clamping arrangement has a press-on member and a counter bearing, with the copy masters clamped between the press-on member and the counter bearing. The counter bearing of the invention is movable in the tensioning direction (D) perpendicular to the film transport direction (E).

2 Claims, 3 Drawing Sheets

APPARATUS FOR TENSIONING COPY MASTERS

BACKGROUND OF THE INVENTION

1. Field of the Invention

The present invention relates to a device for tensioning copy masters with tensioning means that include a clamp for clamping the copy masters between a moveable press on member and a counter bearing. Such device is used in particular for scanning or imaging copy masters in an apparatus which copies the copy masters on copy material, so-called photo printers. The photo printers have an objective which images the copy masters on the copy material. The objective must have a large depth of field and a high image resolution. To satisfy the stringent requirements on depth of field and image resolution, the copy masters have to be in a precise flat position during the copy process. The copy masters are therefore placed under tension for the copying operation.

2. Description of the Related Art

U.S. Pat. No. 5,028,956 describes a device for placing copy masters under tension when the copy masters are copied on copy material. This device produces a very flat film surface by placing the copy masters under tension in a transverse direction perpendicular to the transport direction of the copy masters. To tension the copy masters in the transverse direction, this device has two clamping means which guides the copy masters by clamping the masters on two opposite sides to a platen. The two clamping means are connected to each other by a spring. A force which is applied to the spring perpendicular to the plane of the copy masters, moves the two clamping means towards the copy masters, wherein the clamping means then securely clamp the copy masters on the platen. Additional pressure applied to the spring then moves one of the clamping means outwardly in the transverse direction and away from the other clamping means. A cylinder which makes contact with the copy masters, is attached to the lower end of the clamping means which can move outwardly in the transverse direction. Since the copy masters are clamped to the platen by the respective clamping means which cannot move in the transverse direction, the copy masters are placed under tension in the transverse direction when the other clamping means moves outwardly. The prior art device can only operate if the friction between the clamping means which is movable in the transverse direction, and the copy masters is greater than the friction between the copy masters and the platen guiding the copy masters.

In order to obtain such a friction ratio and to ensure that the prior art device for tensioning the copy masters in the transverse direction operates reliably, an elastomer cover can be applied to the cylinder of the outwardly movable clamping means. Progressive contamination during use, however, can disadvantageously weaken the relative large frictional force of such an elastomer cover required between the cylinder and the copy masters. The tension applied to the copy masters may also cause the elastomer cover to detach over time.

SUMMARY OF THE INVENTION

It is therefore the object of the present invention to provide a device which places the copy masters reliably in a flat position on the copy master guide.

The object is solved by designing the movability of the counter bearing such that it is movable in the tensioning direction perpendicular to the film transport direction.

According to the invention, the counter bearing which clamps the copy masters and places the copy masters under tension, can move in the direction in which the tension is applied. Consequently, the copy masters need not slide on the counter bearing when placed under tension. If the press-on force is large enough, the counter bearing moves outwardly to the same extent as the copy masters move in the direction of the applied tension, so that the copy masters are in a completely flat position on the guide. The copy masters can be reliably placed under tension with the device of the invention, without depending on the friction ratio between the press-on member and the film, or between the counter bearing and the film.

Advantageously, the counter bearing is rotatably supported by a very simple support mechanism. Commercially available ball bearings can be employed.

In a preferred embodiment of the invention, the counter bearing is a rotatably supported roller. Advantageously, only a small frictional force is then required between the counter bearing which is in the form of a roller, and the copy masters to reliably place the copy masters under tension. The copy masters can then be properly placed under tension with only a small applied press-on force.

The invention and its advantages will be described in the following with reference to an embodiment and to the drawings.

Other objects and features of the present invention will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference numerals delineate similar elements throughout the several views.

In the following, the same reference numerals will be used for identical elements or for elements having an identical function.

DETAILED DESCRIPTION OF THE PRESENTLY PREFERRED EMBODIMENTS

Figure 1:
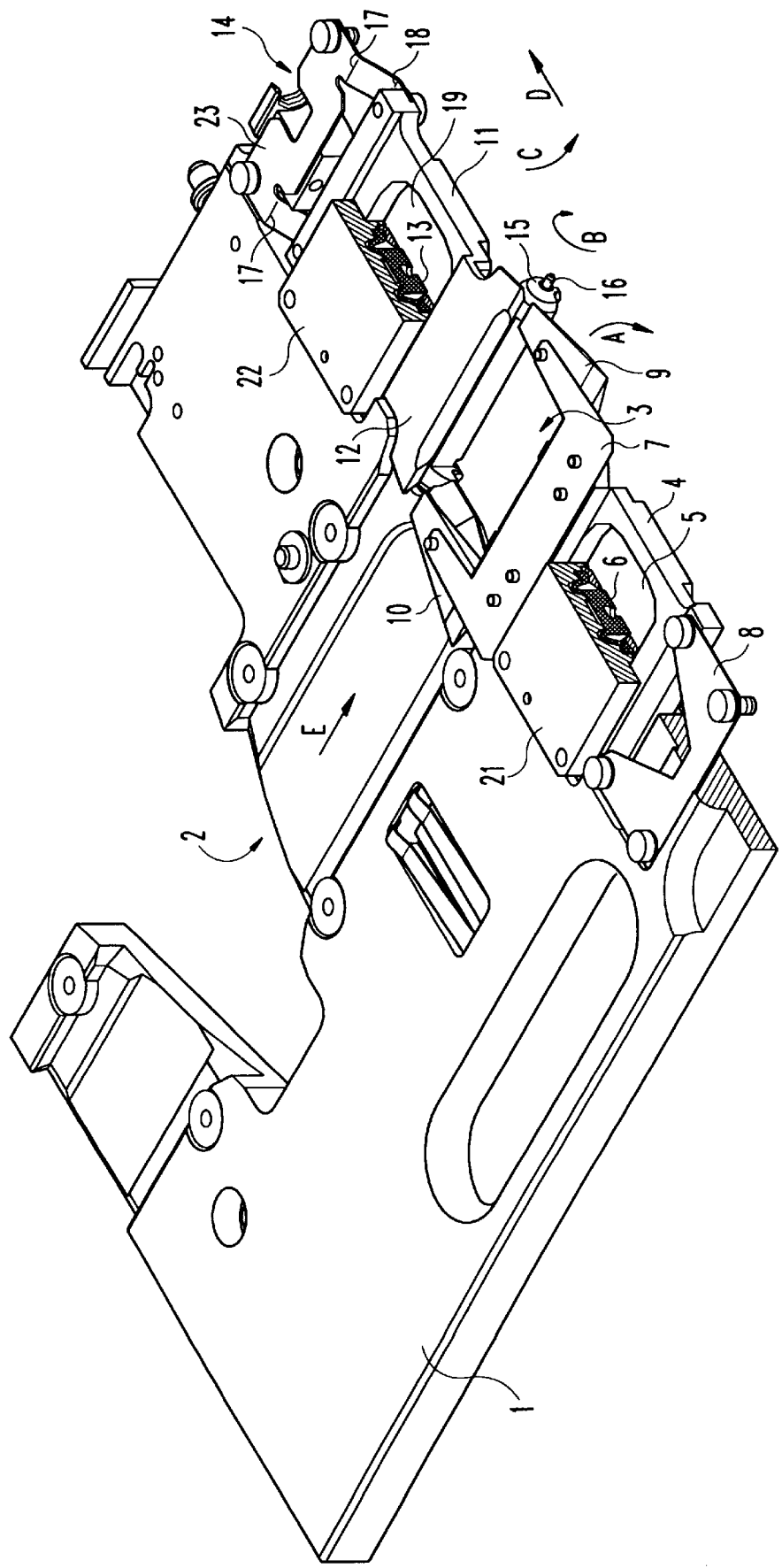
FIG. 1 is a perspective view of an embodiment of the invention.

FIG. 1 shows the perspective view of the embodiment of the device of the invention for tensioning copy masters. The device of the invention is used with an optical beam path for imaging copy masters on photographic paper. Such optical path is employed in an apparatus for copying photographic copy masters on photographic paper, a so-called photo printer. FIG. 1 shows a copy platen 1, with a film path 2 which guides the copy masters of the photographic film along a film transport direction E. The copy platen 1 in the photo printer is covered with a cover plate (not shown). A second film path which is complementary to the film path 2, is machined into the cover plate. The two edges of the film path 2 have continuous raillike raised sections supporting the marginal edges of the copy masters. With this design, the exposed frames of the copy masters are not damaged when the copy masters are advanced in the film transport direction.

The film path 2 has an opening which serves as copy window 3 for copying the copy masters. The two longitudinal sides of the film path 2 have clamping means for clamping the copy masters in the area of the copying window 3 during copying on the copy material. A first clamping means has two clamping legs 9 and 10, which are secured to the flanges of a U-shaped first leaf spring 7. The clamping legs 9 and 10 are located above the transverse sides of the copy window 3, so that the copy masters can be clamped between the clamping legs 9 and 10 and the film path 2 of the copy platen 1 when the clamping legs 9 and 10 are pressed downwards—in the direction of the copy platen 1. Below the two clamping legs 9 and 10, the copy platen 1 has small webs which extend transversely to the film transport direction E and which act as a counter bearing for the clamping legs 9 and 10 when the copy masters are clamped.

The U-shaped first leaf spring 7 operates as a joint so that the clamping legs 9 and 10 can move upwards and downwards and pivot in the longitudinal direction. The first leaf spring 7 provide certain degrees of freedom which allow the clamping legs 9 and 10 to adapt to the position of the respective counter bearings during the clamping operation. This provides a particularly tight fit between the clamping legs and the corresponding counter bearing and consequently a reliable clamping action.

The web of the U-shaped leaf spring 7 is secured to a first press-on member 4, which has a cup-shaped recess 5 for receiving a first pressure cylinder 6. A first mounting plate 21 is arranged above the pressure cylinder 6 and fastened to the copy platen 1 with screws. The pressure cylinder 6 is thus located between the first mounting plate 21 and the first press-on member 4. The pressure cylinder 6 is a membrane cylinder which generates the force for raising and lowering in a moving direction. A the first press-on member and the clamping legs 9 and 10 which are connected to the first press-on member 4 via the first spring 7. The first pressure cylinder 6 operates directly on the first press-on member 4.

A second leaf spring 8 is secured to the longitudinal slide of the first press-on member 4 which faces the first lead spring 7. The second leaf spring 8 is also U-shaped, with the ends of the two flanges attached to the first press-on member 4 and the web attached to the copy platen 1. The second leaf spring 8 operates as a joint. The clamping legs 9 and 10 are connected with the second leaf spring 8 via the first leaf spring 7 and the first press-on member 4 and move downwardly in the direction of the copy platen 1 when a corresponding force is applied to the first press-on member 4, and move upwardly under the restoring force of the second leaf spring 8 when the force is no longer applied. The two clamping legs 9 and 10 then move in a direction opposite to the moving direction A and do no longer clamp.

A second clamping means with a clamping rail 12 and a roller 15 which serves as a counter bearing for the clamping rail 12, is located on the other longitudinal side of the copy window 3. In the present embodiment, the longitudinal side of the copy window 3 is formed by the roller 15, with the clamping rail 12 located above the roller 15. The copy masters are guided between the clamping rail 12 and the roller 15. The roller 12 is supported on a rotation axis 16 for rotation in a direction B. The clamping rail 12 extends along the entire length of the longitudinal side of the copy window 3 above the rotatably supported roller 15 and is integrally connected with a second press-on member 11. The second press-on member 11 has a cup-shaped recess 19 into which a second pressure cylinder 13 is inserted. A second mounting plate 22 is located above the pressure cylinder 13 and secured to the copy platen 1 with screws. The pressure cylinder 13 is thus located between the second mounting plate 22 and the second press-on member 11. The second pressure cylinder 13 is a membrane cylinder which produces a force for clamping the copy masters. The force produced by the pressure cylinder 13 acts directly on the second press-on member 11. The second press-on member 11 moves under the applied force downwardly towards the copy platen 1 in a direction C. The second press-on member 11 is attached to the copy platen 1 via a U-shaped third spring 14. A web 23 of the U-shaped third spring 14 is then connected to the copy platen 1, with the flanges of the third spring 14 connected to the second press-on member 11. The third spring 14 operates also as a joint. In addition, when biased, spring 14 provides a restoring force which causes the second press-on member 11 to move backwards opposite to the direction C when the force from the pressure cylinder 13 is no longer applied. The copy masters are then no longer clamped between the clamping rail 12 and the roller 15.

Figure 2:
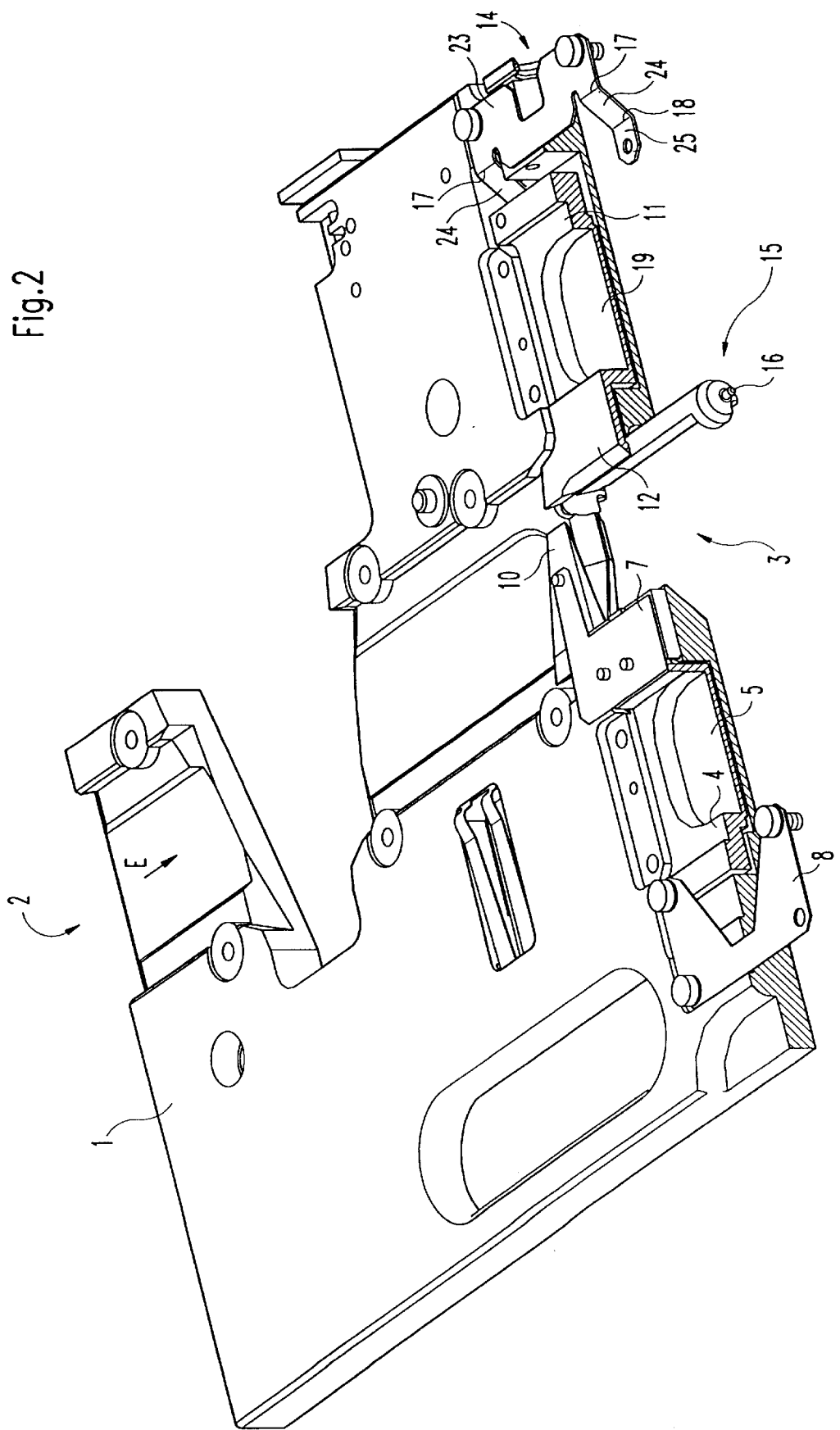
FIG. 2 is another perspective view of the embodiment of FIG. 1.

The flanges of the U-shaped third spring 14 are bent in the shape of a Z, so that the third spring 14 which operates as a joint, has two pivot points 17 and 18. The first pivot point 17 and the second pivot point 18 allow the second press-on member 11 to move upward and downwards, i.e. with and opposite to the moving direction C, and to move in a transverse tensioning direction perpendicular to the film transport direction E, i.e. with and opposite to the transverse moving direction D. The two pivot points 17 and 18 of the third spring 14 are designed such that the second press-on member 11 executes a pivot motion when the second pressure cylinder 13 applies a force. The second press-on member 11 is pushed downwards in the moving direction C—towards the copy platen 1. When the clamping rail rests against the copy masters and consequently also against the roller 15, the copy masters are clamped between the clamping rail 12 and the roller 15. The roller 15 serves as a counter bearing and prevents the press-on member 11 and the clamping rail 12 from moving further in the moving direction C. If the force on the second press-on member 11 is slightly increased and the roller 15 locks in the moving direction C, then the second press-on member 11 moves in the moving direction D, i.e. in the transverse tensioning direction. The second press-on member 11 can move in the transverse tensioning direction D due to the Z-shape of the flanges of the third spring 14 and the pivot points 17 and 18. The movement of the second press-on member 11 in the transverse tensioning direction is transferred to the roller 15 through the force connection between the clamping rail 12 and the rotatably supported roller 15, causing the roller 15 to rotate in the rotation direction B. The copy master clamped between the clamping rail 12 and the roller 15 is thereby placed under tension in the transverse tensioning direction D. The travel of the roller 15 in the rotation direction B is equal to the travel of the clamping rail 12 in the transverse tensioning direction D. Because the clamping rail 12 and the roller 15 are operatively connected, the copy masters and the clamping rail 12 or the roller 15, respectively, do not move relative to each other when the copy masters are placed under tension in the transverse direction D. FIG. 2 which shows a perspective view of the embodiment of FIG. 1, further illustrates the device of the invention. More particularly, FIG. 2 shows a design of the counter bearing 15 in form of a rotatably supported roller.

FIG. 2 also shows the structure of the third spring 14 which is used to connect the second press-on member 11 to the copy platen 1. FIG. 2 shows clearly the two pivot points 17 and 18 which are formed by the two Z-shaped flanges of the U-shaped third spring 14. The two flanges connect directly to the web 23 of the third spring 14 and extend downwardly at an angle. The transitions from the web 23 to the inclined sections 24 represent the first pivot point 17. At the lower ends of the inclined sections 24, the flanges transition into a horizontal section 25. The transitions between the inclined sections 24 and the horizontal sections 25 represent the second pivot point 18. The second press-on member 11 is secured to the horizontal sections 25 of the flanges.

Figure 3:
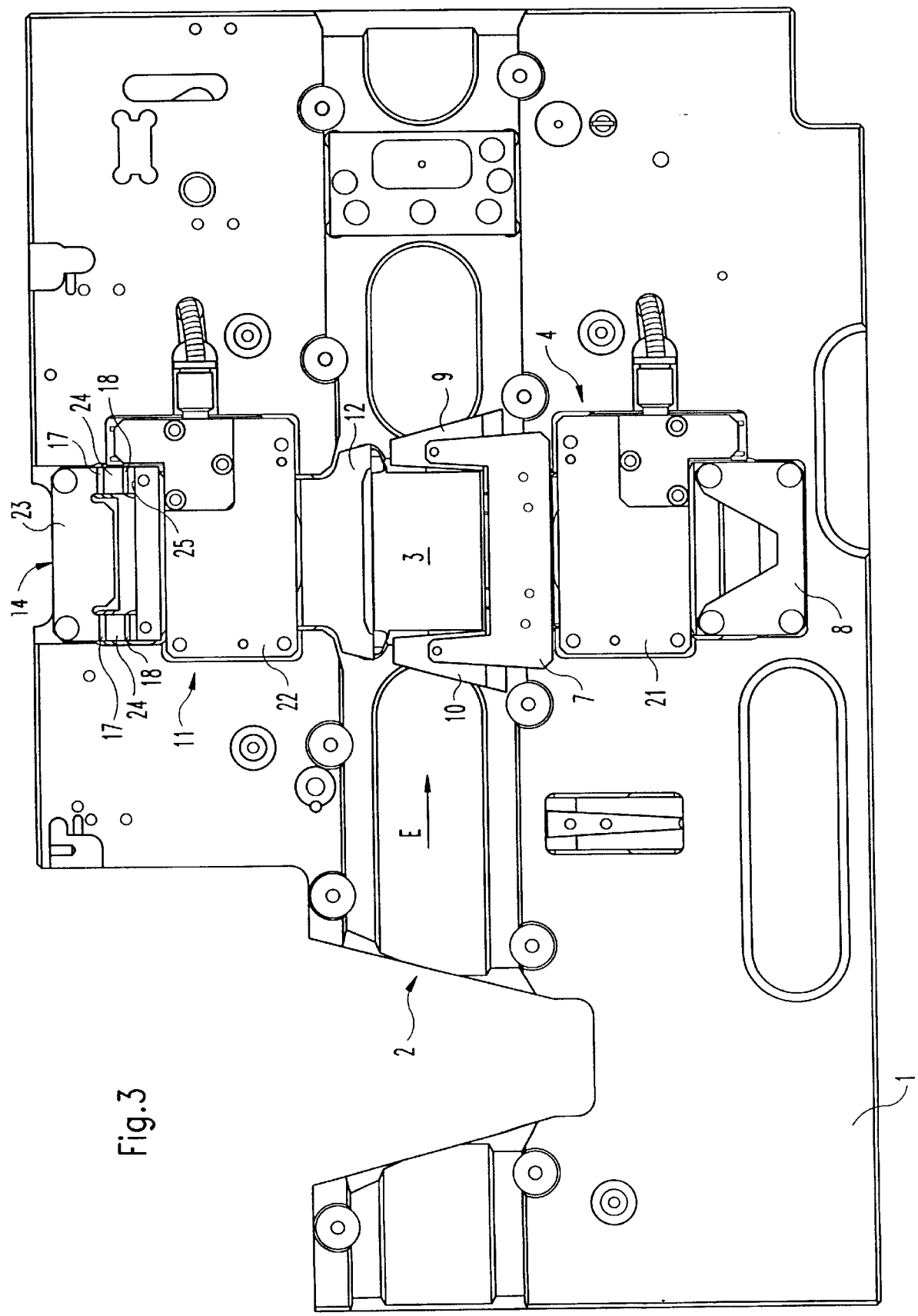
FIG. 3 is a top view of the embodiment of the device of the invention.

For clarity, FIG. 3 is a top view of the embodiment of the device of the invention shown in FIGS. 1 and 2.

In the embodiment described with reference to FIGS. 1 to 3, the counter bearing of the clamping means for clamping the copy masters is constructed as a rotatably supported roller 15. However, a counter bearing of this type which can move in the transverse tensioning direction D, can also be implemented in other ways. For example, the counter bearing can be in the form of a carriage which can move back and forth in the transverse tensioning direction D. The force for moving the carriage can also be transferred via a force connection between the press-on member of the clamping means and the carriage.

Thus, while there have been shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

What is claimed is:

1. An apparatus for tensioning a film copy master comprising:

a guide for guiding the film copy master in a film transport direction (E);

a transverse tensioning device for tensioning the film copy master in a tensioning direction (D) perpendicular to the transport direction (E);

said transverse tensioning device comprises a clamp including press-on member and a counter bearing member, the film copy master being clamped between said press-on member and said counter bearing member;

said press-on member being movable in the direction of the counter bearing member and said counter bearing member being movable in the tensioning direction (D) perpendicular to the film transport direction (E); and wherein the counter bearing member is rotatably supported.

2. The apparatus according to claim 1, wherein the counter bearing member is a roller.

\* \* \* \* \*